Figure 1:
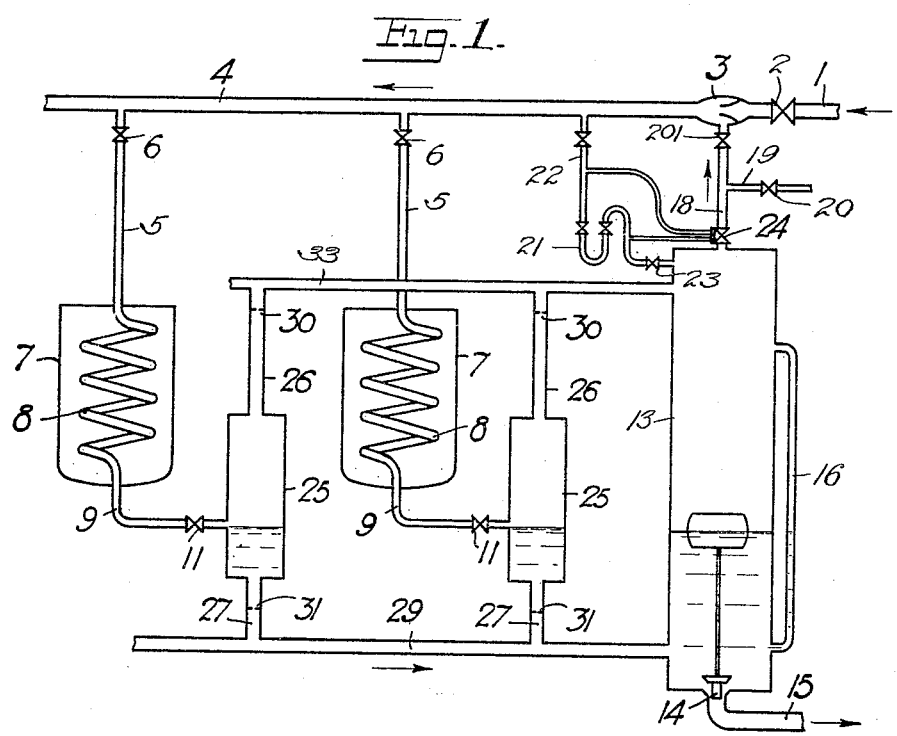

June 27, 1933.    C. ROSENBLAD    1,916,073
MEANS FOR REGULATING THE HEAT EFFECT IN
APPARATUS HEATED INDIRECTLY WITH STEAM
Filed Nov. 20, 1928    2 Sheets-Sheet 1

Inventor
Curt Rosenblad
By Henry Orth Jr.
Atty.

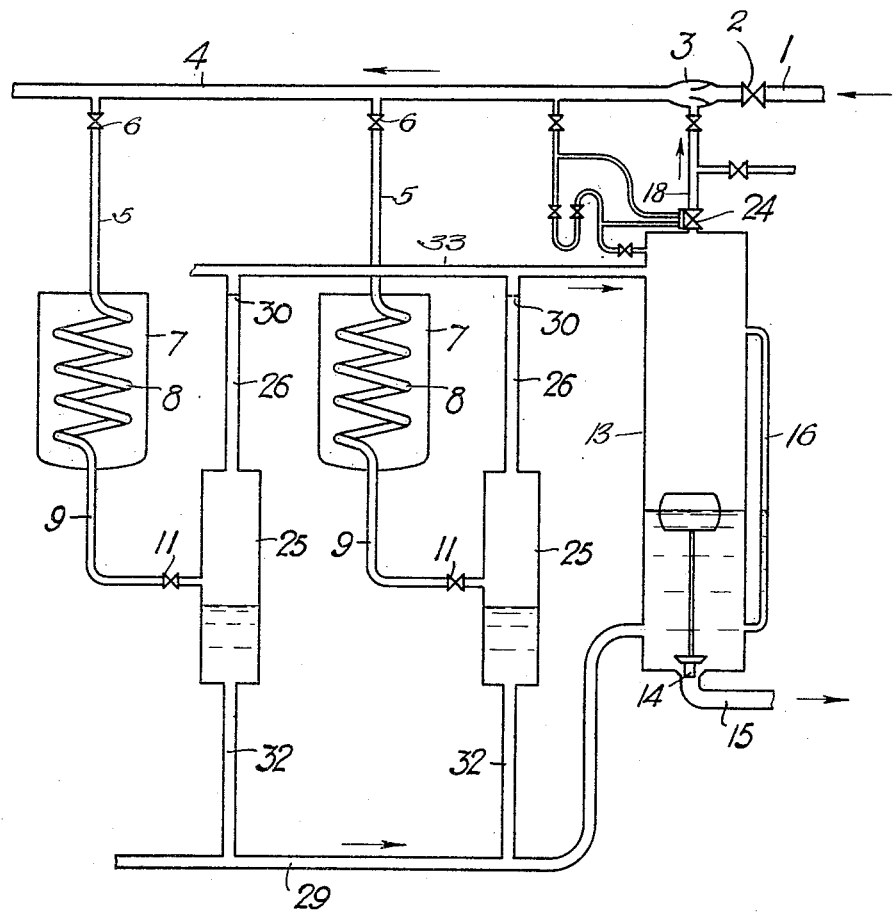

Patented June 27, 1933

1,916,073

UNITED STATES PATENT OFFICE

CURT ROSENBLAD, OF STOCKHOLM, SWEDEN

MEANS FOR REGULATING THE HEAT EFFECT IN APPARATUS HEATED INDIRECTLY WITH STEAM

Application filed November 20, 1928, Serial No. 320,694, and in Germany December 22, 1927.

In steam heated apparatus connected in parallel, such as are used in many industries, it is very important that the condensate is efficiently drawn off or drained, because condensate accumulating on the heat transmitting surfaces will act as an insulation and consequently reduce the transmission of heat.

The theory of heat transmission as well as practical investigations made show that a high coefficient of heat transmission is attained between condensing steam and a heat transmitting wall when the velocity of the steam is high and the degree of wetness of the steam is low, because the thickness of the layer of condensate on said wall will then be reduced to a low value. For this reason it is advantageous in such apparatus to let some of the steam flow through the apparatus to convey the condensate to the outlet and thus to accelerate the draining.

The chief purpose of this invention is to effect an efficient draining of steam heated apparatus connected in parallel, also under unfavorable conditions of operation.

A further object of the invention is to prevent the condensate from one of the apparatus from flowing back into another of said apparatus, when different pressures are prevailing in the individual apparatus as a result of different steam consumption therein.

A further purpose of this invention is to render it possible to regulate the quantity of steam flowing through each apparatus, to its absolute value as well as in relation to the quantity of condensate and independent of the latter. By use of the invention it is possible to regulate the quantity of steam flowing through from zero to any value desired. As stated above, this means that the coefficient of heat transmission which depends upon the degree of wetness of the steam may be adjusted to be maintained at any possible values desired. Consequently, the heat transmitting capacity of the individual heat transmitting surfaces and the heat effect in the individual apparatus may be regulated to any values desired by means of such regulation.

A further purpose of the invention is to create a reserve outlet for the common condensate outlet from the apparatus, when said common outlet or the individual outlets leading from the steam separators to said common outlet are entirely or partially obturated. Because a lower pressure shall prevail in the common steam outlet pipe than in the apparatus proper, on account of the effect of the throttled passages used in accordance with the invention, the condensate will flow to the common steam outlet pipe, when said condensate outlets or any of them are obturated, and also under these unfavourable conditions an effective draining of the apparatus is attained.

In the annexed drawings, two different embodiments of my invention are illustrated diagrammatically. Fig. 1 shows an embodiment in which the steam flowing through the apparatus and the condensate are drawn off individually through throttled passages to the common outlet pipes after they have been separated from each other in separators after each apparatus. Fig. 2 is a modification in which the steam flowing through is let out through a throttled passage at each apparatus and the condensate is let out through a U-shaped pipe forming a water seal.

Referring now to Fig. 1 of the drawings, 1 indicates a supply pipe for steam for heating purposes. In this pipe a main valve 2 and an injector 3 operated by the steam supplied are inserted. The steam flowing through the heating apparatus is returned by said injector to the heating apparatus. A steam pipe 4, for the steam mixture produced by the injector, is connected to the injector, said pipe being connected by branch pipes 5 to each one of the heating apparatus 7 working in parallel. Admission valves 6 are provided in the branch pipes 5. Heating elements or coils 8 are provided in said apparatus and are connected to an outlet pipe 9 from each of the heating apparatus. In each of the said latter pipes a stop-valve 11 is inserted. A steam separator 25 is inserted in the pipe 9 after the valve 11 to separate the condensate more or less completely from the steam flowing through. Said steam then flows separately through the throttled passage 30 and the conduit 26 to the common steam outlet pipe 33 discharging into the steam chamber of a discharger 13 containing the water of condensation. The condensate is separately drawn off from the steam separators 25 through the conduits 27 and the throttled passages 31 to the common condensate outlet pipe 29 also discharging into the discharger 13. Said discharger is provided with a float valve 14 and an outlet 15 for the condensate as well as a water level indicator 16. The steam flows from the discharger through a pipe 18 and from there according to the circumstances through a pipe 19 and a stop-valve 20 inserted therein to a second steam consuming apparatus working at a lower pressure or through a valve 201 to the injector 3, by means of which it is returned to the heating apparatus 7.

In the pipe 18 a regulating valve 24 is inserted which can be regulated either by hand or automatically in such a manner that a suitable difference of pressure is maintained between the steam supply pipe 4 and the steam chamber of the discharger 13 for the water of condensation. In the drawings the valve 24 is an automatic regulating valve, the regulating member of which is actuated on one hand by the steam pressure in the pipe 4 through a branch pipe 22 and on the other hand by the steam pressure in the discharger 13 for the water of condensation through a branch pipe 23. A pressure gauge pipe 21 indicates the difference between said steam pressures. By maintaining a substantially constant difference of pressure between the pipe 4 and the steam chamber of the discharger 13 for the water of condensation in combination with the throttled passages 30, 31 the effect is obtained that a practically constant quantity of steam always flows through the heating elements 8 removing the water condensed.

Said difference of pressure should be maintained at such a high value that the whole quantity of steam and condensate from the pipes 9 can flow out through passages 30 to the pipe 33, even if the common condensate outlet pipe or the throttle passages 31 in the condensate outlets are obturated. In this case the outlet pipe 33 serves as a reserve pipe for the condensate outlet and an effective draining is attained also under such unfavourable conditions of operation. If such obturation is only partial some of the condensate follows the steam through the throttled passages 30 to the pipe 33 while the remainder of the condensate flows through the throttled passages 31 and the pipe 29 to the discharger 13.

Said difference of pressure must also be so high that the pressure in the common condensate and steam outlet pipes 29 and 33 is always sufficiently lower than that prevailing in the heating elements 8, so that said elements are properly drained even if the pressure in any heating element should temporarily decrease below that of the other elements as the result of a great steam consumption in said first-mentioned element. The throttled passages render it possible to have different pressures in each one of the elements 8 and a lower pressure in the common outlet pipe 29. If said throttled passages were not provided the condensate from the elements having a higher pressure would flow back into that or those elements which have a lower pressure, and consequently the draining of the latter would cease. It is also obvious that it is impossible to dispense with either of the throttled passages 30, 31. If the throttled passages 31 are omitted, the condensate together with the steam flowing through would escape through the pipes 27, 29 to the discharger 13, while the condensate and the steam flowing through would together escape through the pipes 26 to the discharger 13, if the throttled passages 30 are dispensed with. In both cases the individual separators 25 would be quite useless and the efficient draining and the individual regulation in accordance with this invention would not be attained and there would be a risk that the condensate would flow back into the elements having a lower pressure.

Because the steam flowing through ("the flash steam") will generally flow somewhat intermittently (in bubbles) through the individual outlets 9, it is advantageous to use the steam separators 25 for separating said steam from the condensate. Then the steam may be drawn off separately through the throttled passages 30 and the condensate separately through the throttled passages 31, and the operation will thus be more safe and quiet and more easy to control than in the case that the steam and the condensate are drawn off together through a common throttled passage. It is easier to dimension the orifices of the throttled passages 30 and 31 properly, if only pure steam or pure condensate is to pass through them normally. As stated above the heat transmitting efficiency of the heating elements depends upon the quantity of steam flowing through in relation to the quantity of condensate, i. e. depends upon the relative size of the orifices 30 and 31 and may be regulated by dimensioning said orifices accordingly.

Finally it is to be observed that the use of the throttled passages in accordance with this invention renders it possible to use a common condensate discharger for draining several apparatus, though different pressures are prevailing in the heating elements of said apparatus. In spite of the different pressures there is no risk that any condensate will flow back into an apparatus having a lower pressure than that of the other, as stated above. The use of one common condensate discharger renders the control easier, lowers the costs, and aids in keeping the pressures in the pipes 33 and 29 equal and constant. Heretofore, it was not possible to use one common discharger for draining several apparatus efficiently, if differently pressures prevailed in said apparatus.

The maintenance of a constant difference of pressure between the steam pipe 4 and the common outlet pipe 33 for the steam flowing through is facilitated by the provision of a common condensate discharger, into the team chamber of which said common outlet pipe for the steam flowing through discharges.

According to Fig. 2 for the throttled passages 31 in Fig. 1 pipes 32 are substituted extending so far below the normal water level in the discharger 13 for the water of condensation and communicating with said discharger through a pipe 29 that U-shaped water seals are formed, which prevent an overflow of steam from the separators 25 through the pipes 32, 29 to the discharger for the condensed water. The water seals serve to maintain a higher pressure in the individual separators 25 than in the common outlet pipes 29 and 33 and are, thus, equivalent to the throttle passages 31 in Fig. 1. Neither the throttle passages 30 nor the water seals may be dispensed with for the same reasons as stated above in connection with the corresponding parts of Fig. 1. In other respects the arrangement and operation are the same as in Fig. 1.

The use of an ejector operated by the steam to be consumed in the heating apparatus in combination with throttled passages in the outlets of the apparatus is claimed in my co-pending U. S. patent application Serial No. 435,834, filed March 14, 1930.

What I claim is:—

1. In a plant comprising a plurality of steam-heated apparatus, in combination, heating elements in said apparatus connected in parallel to a common steam supply pipe, outlets from said elements, steam separators connected with said outlets, a common condensate outlet pipe, a common steam outlet pipe, a separate conduit for steam from each of said steam separators to said common steam outlet pipe, a separate conduit for condensate from each of said steam separators to said common condensate outlet pipe, throttled passages in said steam conduits and said condensate conduits adapted to cause the pressure in said common outlet pipes to be lower than the lowest pressure in any of said elements, and means for drawing off the steam from said common steam outlet pipe.

2. In a plant comprising a plurality of steam-heated apparatus, in combination, heating elements in said apparatus connected in parallel to a common supply pipe for live steam, outlets from said elements, steam separators in said outlets, a separate steam conduit from each of said steam separators, a separate condensate conduit from each of said steam separators, a common steam outlet pipe connected with all of said steam conduits, a common condensate outlet pipe connected with all of said condensate conduits, throttled passages between said elements and said common outlet pipes adapted to cause the pressure in said common outlet pipes to be lower than the lowest pressure in any of said elements, a common discharger connected with said common condensate outlet pipe and said common steam outlet pipe, and from said discharger a steam suction pipe connected with a steam sucking device.

3. In a plant comprising a plurality of steam-heated apparatus, in combination, heating elements in said apparatus connected in parallel to a common supply pipe for live steam, outlets from said elements, steam separators in said outlets, a separate steam conduit from each of said steam separators, a separate condensate conduit from each of said steam separators, a common steam outlet pipe connected with all of said steam conduits, a common condensate outlet pipe connected with all of said condensate conduits, throttled passages between said elements and said common outlet pipes adapted to cause the pressure in said common outlet pipes to be lower than the lowest pressure in any of said elements, a steam suction pipe from a steam sucking device connected with said common steam outlet pipe, and valve in said steam suction pipe actuated by the steam pressure in said common steam supply pipe and said common steam outlet pipe to maintain automatically a substantially constant difference between said steam pressures.

In testimony whereof I have signed my name.

CURT ROSENBLAD.